(12) United States Patent
Monk

(10) Patent No.: US 8,019,284 B2
(45) Date of Patent: Sep. 13, 2011

(54) HELICOPTER ROTOR BLADE BLOCKAGE BLANKING

(75) Inventor: Anthony D. Monk, Seattle, WA (US)

(73) Assignee: The Boeing Company, Chicago, IL (US)

( * ) Notice: Subject to any disclaimer, the term of this patent is extended or adjusted under 35 U.S.C. 154(b) by 450 days.

(21) Appl. No.: 12/329,371

(22) Filed: Dec. 5, 2008

(65) Prior Publication Data

US 2010/0330926 A1 Dec. 30, 2010

(51) Int. Cl.
*H04B 1/00* (2006.01)

(52) U.S. Cl. .................................. 455/63.1; 455/98

(58) Field of Classification Search ............... 455/39, 455/63.1, 67.11, 67.15, 98, 114.2, 431
See application file for complete search history.

(56) References Cited

U.S. PATENT DOCUMENTS 7,366,125 B1 * 4/2008 Elliott ........................ 370/316
7,656,933 B2 * 2/2010 Klinke et al. ................ 375/144

OTHER PUBLICATIONS

Carmen Cerasoli, Ka-Band SATCOM in A2C2S, MILCOM 2004—2004 IEEE Military Communications Conference, pp. 370-376.

* cited by examiner

*Primary Examiner* — Jeffrey S Zweizig
(74) *Attorney, Agent, or Firm* — Toler Law Group

(57) ABSTRACT

Methods and systems for blanking a transmission signal to prevent blockage by a recurring obstruction, such as a plurality of helicopter rotor blades, are provided. An obstruction that may block a communication line of sight path is monitored. It is determined when the obstruction is expected to block transmission of a transmitted signal along the communication line of sight path based on monitoring when the obstruction blocks the communication line of sight path. A transmission blanking signal is generated, where the transmission blanking signal is configured to selectively stop transmission of the transmitted signal along the communication line of sight path when the obstruction is expected to block the communication line of sight path.

20 Claims, 7 Drawing Sheets

HELICOPTER ROTOR BLADE BLOCKAGE BLANKING

FIELD OF THE DISCLOSURE

The present disclosure is generally related to controlling transmission of communications signals that are recurringly blocked by one or more obstacles.

BACKGROUND

Aircraft, particularly military aircraft, may carry microwave communications equipment that enables high-speed, beyond line of sight satellite communications. In the case of fixed-wing aircraft, there are many locations on an upper surface of the aircraft where a microwave antenna may be mounted to communicate with visible satellites with a clear line of sight.

On the other hand, mounting a microwave antenna on an upper surface of a helicopter presents concerns because a plurality of helicopter rotor blades will rotate above most, if not all, of the upper surfaces of the helicopter. The plurality of helicopter rotor blades will recurringly block the upper surfaces of the helicopter from orbiting satellites above the helicopter. Thus, if a microwave antenna is mounted on an upper surface of the helicopter, the plurality of helicopter rotor blades will repeatedly block a communication line of sight, path between the microwave antenna and the orbiting satellites.

When the microwave antenna is receiving a signal from the satellite, the plurality of helicopter rotor blades may block some sections of the signal in the time domain, and the receiver may have to request retransmission of those sections of the signal. When the microwave antenna is transmitting a signal, the problem is even more significant. Not only may the plurality of helicopter rotor blades prevent successful transmission of some sections of the signal, but the plurality of helicopter rotor blades also will reflect and scatter some fraction of the signal power in other directions, particularly downward. The reflected microwave signal presents a potential health concern for personnel working on or near the helicopter. The reflected microwave signals also may potentially interfere with the successful operation of other equipment on board the helicopter, or of electronic equipment located on the ground below the helicopter. Moreover, reflected and scattered energy from the reflected microwave signals will tend to make the helicopter electronically-visible to electronic signal detection equipment, putting the helicopter and its crew at risk of exposure and possible attack.

To circumvent the problem posed by mounting the microwave antenna on the upper surface of the helicopter, the microwave antenna can be mounted in other positions to avoid blockage by the plurality of helicopter rotor blades. For one example, the helicopter can be equipped with a mast extending beyond the area blocked by the plurality of helicopter rotor blades to prevent blockage of the communication line of sight path between the microwave antenna and the satellite. Unfortunately, the extent of the rotor sweep would, in almost all cases, leave little, if any room for a fixed mast. One alternative is to locate the microwave antenna above the rotor hub, as is done, for example, with the AH-64D Apache Longbow radar system. However, adding a rotor-mounted antenna to a helicopter would involve major modifications to the helicopter.

Alternatively, the microwave antenna may be mounted on a lateral surface of the helicopter, to transmit signals along a communication line of sight path that will not be blocked by the plurality of helicopter rotor blades. However, in order to provide continuous communications capability with the helicopter for all heading orientations, microwave antennas would have to be mounted on both sides of the helicopter. Even more problematic is that satellites would have to be orbitally-located such that at least two satellites would be in communications line of sight with the side-mounted microwave antennas. The need for additional satellites visible to the helicopter to facilitate such communication represents a substantial additional cost, and operational constraint in terms of the locations in which communications are possible.

SUMMARY

Methods and systems for blanking a transmitted signal to prevent blockage by a recurring obstruction, such as a plurality of helicopter rotor blades, are provided. According to a particular illustrative embodiment, the spatial location and orientation of an obstruction that may block a communication line of sight path is monitored. It is determined when the obstruction is expected to block transmission of a transmitted signal along the communication line of sight path based on monitoring when the obstruction blocks the communication line of sight path. A transmission blanking signal is generated, where the transmission blanking signal is configured to selectively stop transmission of the transmitted signal along the communication line of sight path when the obstruction is expected to block the communication line of sight path.

According to another embodiment, a microwave signal is received from an antenna system configured to receive the microwave signal and configured to transmit a transmitted microwave signal along a communication line of sight path. A plurality of helicopter rotor blades recurringly blocks the communication line of sight path. A received signal strength indicator (RSSI) of the received microwave signal is repeatedly sampled. A blockage cycle is determined based on recurring decreases in the RSSI indicative of blocked time periods when at least one of the plurality of helicopter rotors is blocking the communication line of sight path.

According to yet another embodiment, an indicator is configured to determine when a communication line of sight path between an antenna mounted on an aircraft and a communication point is blocked by one of a plurality of aircraft rotor blades. A blanking signal generator is configured to receive an input from the indicator signaling when the communication line of sight path is blocked. The blanking signal generator also is configured to generate a blanking signal to identify when a transmitted signal should be stopped based on when the communication line of sight path is blocked. A transmission cutoff switch is configured to receive the blanking signal and to selectively stop transmission of the transmitted signal.

The features, functions, and advantages that have been or will be discussed can be achieved independently in various embodiments or may be combined in yet other embodiments further details of which can be seen with reference to the following description and drawings.

DETAILED DESCRIPTION

To prevent unwanted effects of a transmitted signal being blocked by an obstruction that recurringly blocks a communication line of sight path, particular embodiments of the present disclosure monitor the obstruction in order to selectively stop transmission of the transmitted signal. Particular embodiments monitor the obstruction to determine when it blocks the communication line of sight path and generates a blanking signal that causes a transmission cutoff switch to selectively stop transmission of the transmitted signal. Presence of the obstruction may be determined by monitoring a received signal strength indication of a signal being received to determine when the obstruction blocks the communication line of sight path. Alternatively, the obstruction may be monitored by monitoring a position of the obstruction and, based on that position information, selectively stopping transmission of the transmitted signal.

Figure 1:
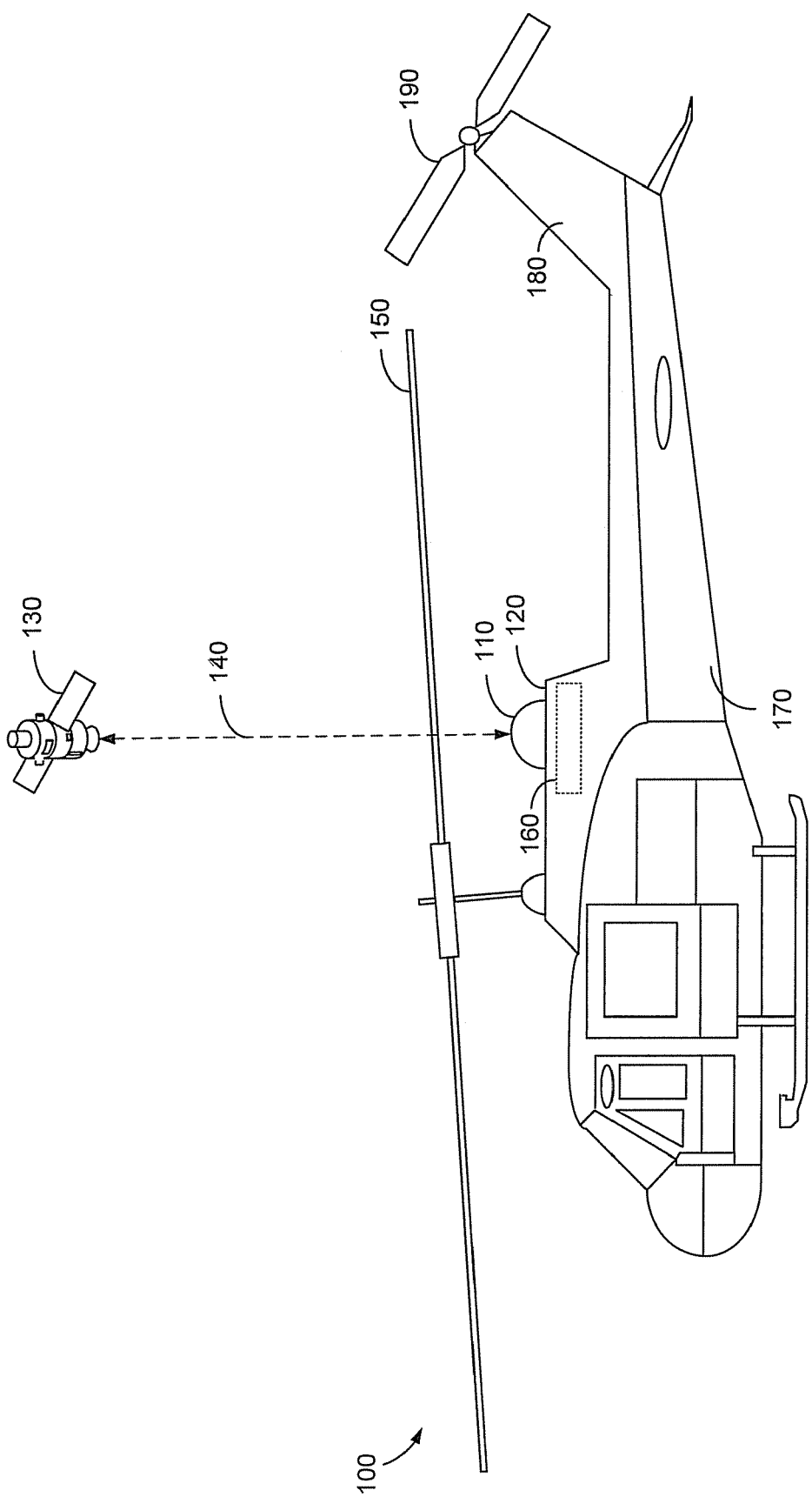
FIG. 1 is a side view of a helicopter equipped with microwave antenna on an upper surface of the helicopter that is configured to communicate with an orbiting satellite.

FIG. 1 shows a side view of a helicopter 100 equipped with a microwave antenna 110 disposed on an upper surface 120 of a fuselage of the helicopter 100. The microwave antenna 110 is configured to enable the helicopter 100 and its crew (not shown in FIG. 1) to communicate with a satellite 130 positioned overhead of the helicopter 100 along a communication line of sight path 140. However, a plurality of helicopter rotor blades 150 of the helicopter 100, which rotate in a plane that intersects the communication line of sight path 140, will recurringly block the communication line of sight path 140 between the microwave antenna 110 and the satellite 130. Each of the plurality of helicopter rotor blades 150 acts as an obstruction that recurringly blocks the communication line of sight path 140 while each of the plurality of helicopter rotor blades 150 passes through the communication line of sight path 140 between the microwave antenna 110 and the satellite 130.

Blocking the communication line of sight path 140 by the plurality of helicopter rotor blades 150 may disrupt communications with the satellite. Moreover, the blocking of the communication line of sight path 140 by the plurality of helicopter rotor blades 150 when the microwave antenna 110 is transmitting a microwave signal will reflect and scatter the microwave energy away from the line of sight direction to the satellite. Blocking and reflection of the microwave signal not only may disrupt the helicopter's 100 communication and other on-board systems, but may also cause "forward scattering" of the microwave energy away from the direction of the satellite with which the helicopter is communicating. Forward scattering has the potential to interfere with other satellites at adjacent orbital locations on a same geostationary orbital (GSO) arc. In addition, the scattering of the microwave energy may be potentially dangerous for the crew of the helicopter 100, and may interfere with other electronic systems installed on the helicopter. The scattering of the microwave also may make the helicopter 100 more visible to tracking equipment that seeks to identify the position of the helicopter 100 which, in military situations, may be highly undesirable.

Particular embodiments of the present disclosure include a transmission blanking system 160 coupled with the microwave antenna 110 or with other portions of a microwave transmission system on board the helicopter to determine when one of the plurality of helicopter rotor blades 150 blocks the communications line of sight path 140. The transmission blanking system 160 is configured to generate a blanking signal that selectively stops transmission of a transmitted signal while one of the plurality of helicopter rotor blades 150 blocks the communications lines of sight path 140. By selectively stopping transmission of the transmitted signal when one of the plurality of helicopter rotor blades 150 blocks the communication line of sight path 140, the transmission blanking system 160 prevents the undesired reflection and scattering of microwave energy by the rotor blades 150.

To prevent the communication line of sight 140 between the microwave antenna 110 and the satellite 130 from being blocked by the plurality of helicopter rotor blades 150, the microwave antenna 110 may be mounted on a side surface 170 of the helicopter 100. However, mounting the microwave antenna 110 on the side surface 170 would change the communication line of sight path 140 to project outward from the side surface 170 of the helicopter 100. To continue to enable communication between the helicopter 100 and the orbiting satellite 130, additional satellites would have to be inserted in orbit to provide satellite coverage using such a below-the-rotor placement of the microwave antenna 110. Without additional satellites in place, helicopters simply may not be able to engage in microwave communications in various geographical areas. In addition, even if sufficient satellite coverage is available, duplicate microwave antennas 110 would have to be installed on both sides of the helicopter 100.

Alternatively, the microwave antenna 110 could be mounted on a portion of the helicopter 100 over which the plurality of helicopter rotor blades 150 do not pass, such as on a tail section 180 of the helicopter 100. However, positioning the microwave antenna 110 on the tail section 180 may not be possible without interfering with tail systems of the helicopter 100, such as the tail rotor 190. A mast (not shown in FIG. 1) could be erected on the tail section to extend away from the fuselage of the helicopter 100 or away from the tail rotor 190. However, such a mast would interfere with the balance and aerodynamics of the helicopter, to say nothing of the complexity and cost of erecting such a mast.

Figure 2B:
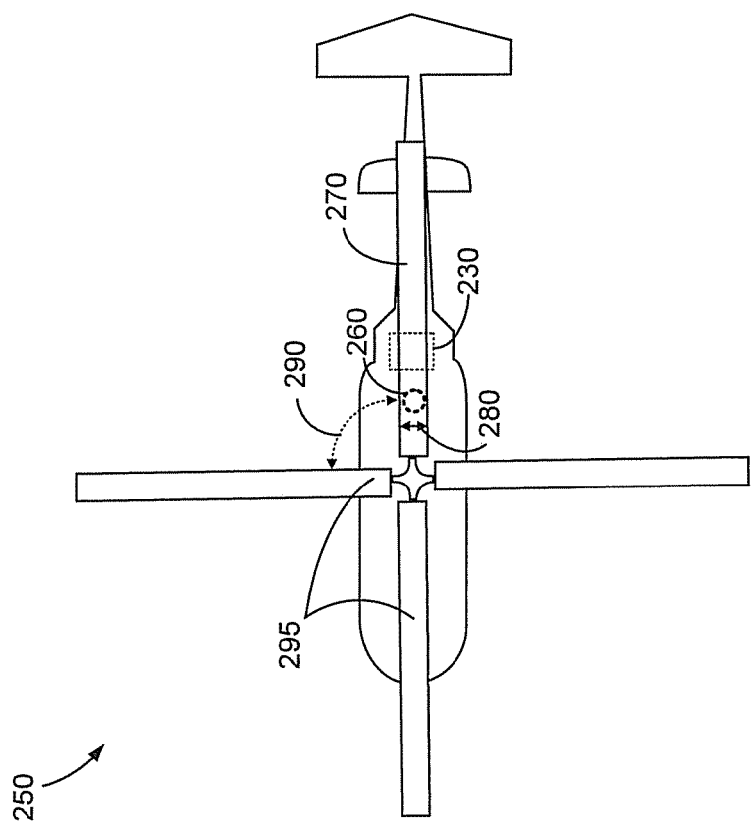
FIGS. 2A-2B are top views of a helicopter of FIG. 1 equipped with the microwave antenna on the upper surface of the helicopter to illustrate blockage of the microwave antenna by rotation of the plurality of helicopter rotor blades.
Figure 2A:
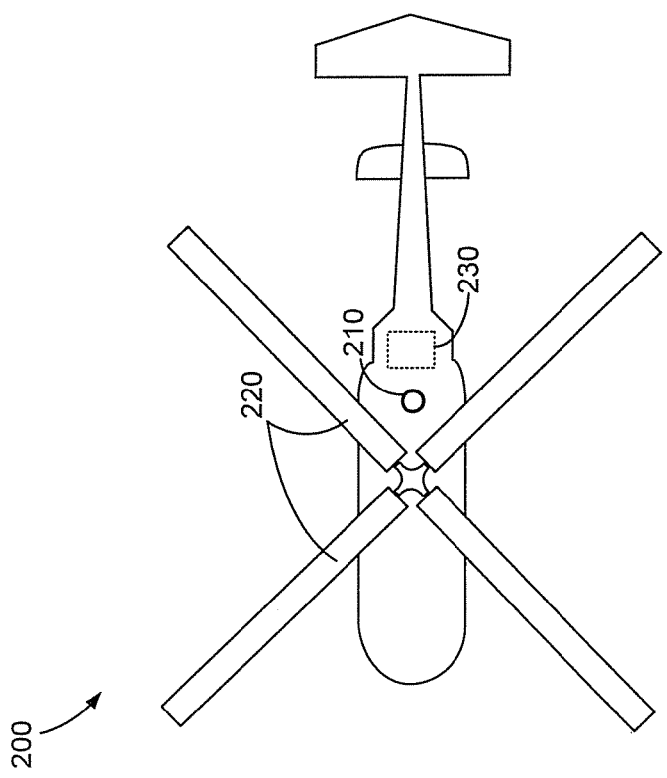

FIGS. 2A and 2B illustrate top views of the helicopter 100 of FIG. 1 to further illustrate when a communication line of sight may be blocked to further describe operation of a transmission blanking system 260 included in a helicopter 200 of FIG. 2A and a helicopter 250 of FIG. 2B.

FIG. 2A shows the helicopter 200 equipped with a top-mounted microwave antenna 210. The microwave antenna 210 is configured to communicate along a communications line of sight path (not shown in FIG. 2A) that extends along an axis that would extend outwardly from the page including FIG. 2A and that extends through an area that will be recurringly blocked by one of a plurality of helicopter rotor blades 220 as the plurality of helicopter rotor blades 220 are in motion. The helicopter 200 includes a transmission blanking system 230 that will enable the helicopter 200 to avoid transmitting when the plurality of helicopter rotor blades 220 blocks the communication line of sight path, as further described below.

In FIG. 2A, the microwave antenna 210 is not blocked by any of the plurality of helicopter rotor blades 220. When the communication line of sight path of the microwave antenna 210 is not blocked by one of the plurality of helicopter rotor blades 220, the microwave antenna 210 is able to receive signals from a satellite (not shown in FIG. 2A) overhead without any of the plurality of helicopter rotor blades 220 blocking and, thus, diminishing the strength of received signals. The microwave antenna 210 also is able to transmit transmitted signals to the satellite without any of the plurality of helicopter rotor blades 220 blocking and reflecting the transmitted signals.

In FIG. 2B, on the other hand, a microwave antenna 260 mounted on an upper surface of a helicopter 250 is blocked by a rotor blade 270. When the rotor blade 270 at least partially covers the microwave antenna 260, the rotor blade 270 blocks the communication line of sight path of the microwave antenna. As a result, the microwave antenna 260 may not be able to receive signals from a satellite (not shown in FIG. 2B). If the microwave antenna 260 is able to receive a signal from the satellite while being blocked by the rotor blade 270, the received signal strength of the signal, at least, will be significantly reduced as a result of the blockage.

Also, when the rotor 270 covers the microwave antenna 260 and blocks the communication line of sight path to the satellite, the microwave antenna 260 cannot successfully be used to transmit a transmitted signal to the satellite. Instead, if a transmitted signal is broadcast when the rotor blade 270 blocks the communication line of sight path, the rotor blade 270 will reflect and scatter the transmitted signal: However, because the helicopter 250 is equipped with the transmission blanking system 230, the transmission blanking system 230 may selectively stop the transmission of a transmitted signal when the rotor blade 270 or any of a plurality of helicopter rotor blades 295 blocks the communication line of sight path of the microwave antenna 260. The transmission blanking system 230 thus may prevent the reflecting and scattering of microwave energy that may result from seeking to transmit a signal from the microwave antenna 260 when the communication line of sight path is blocked by one of the plurality of helicopter rotor blades 295.

Figure 3:
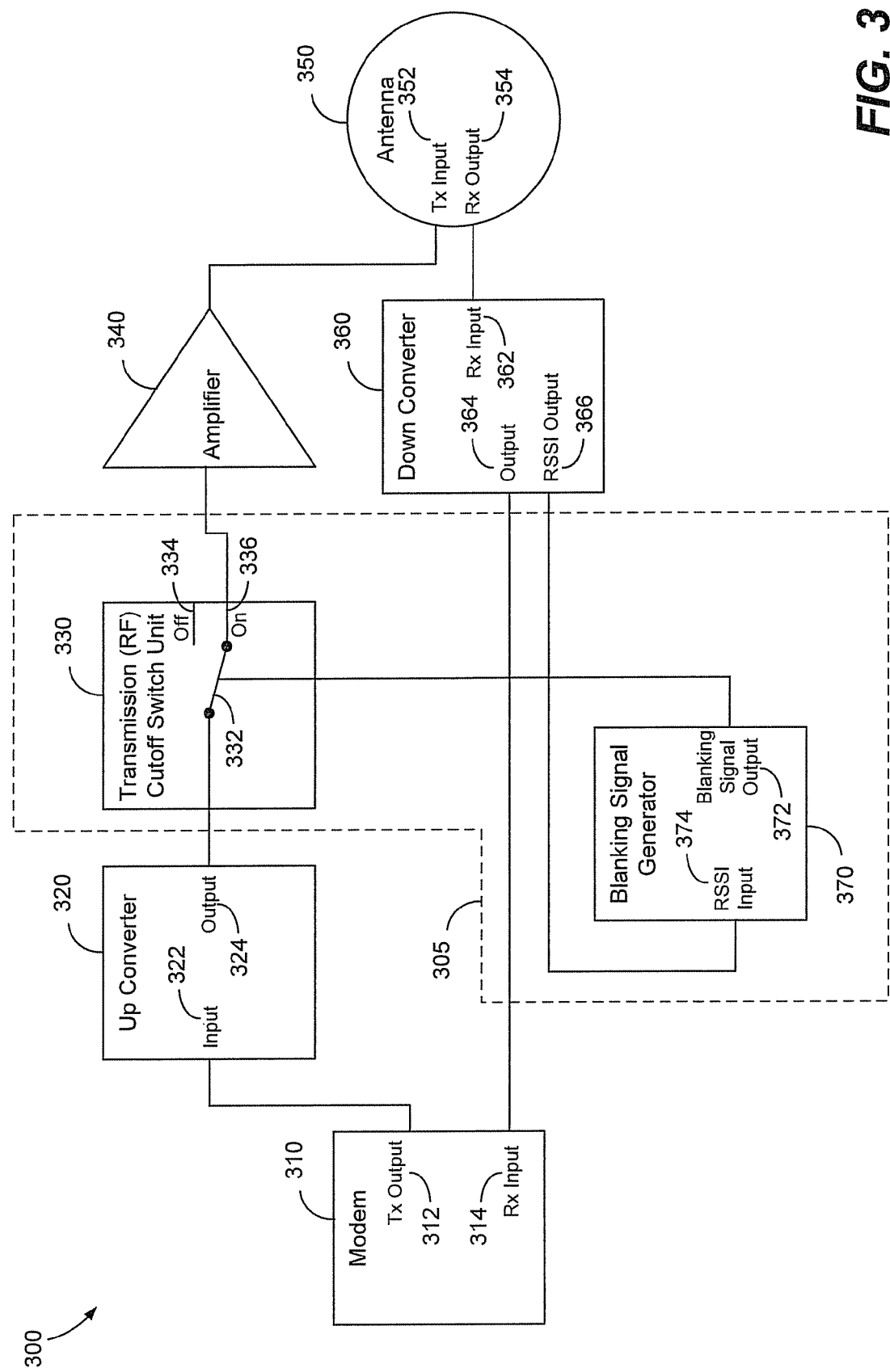
FIG. 3 is a block diagram of a particular illustrative embodiment of a blanking system that monitors a received signal strength indicator (RSSI) of a received signal and generates a blanking signal to selectively stop transmission of a microwave signal.

FIG. 3 is a block diagram of a communications system 300 including for a particular illustrative embodiment of a blanking system 305 to selectively stop the transmission of a microwave signal when an obstruction, such as a helicopter rotor blade, blocks a communication line of sight path of a microwave antenna. The communication system 300 includes a modem 310, an up converter 320, a transmission cutoff switch unit 330, an amplifier 340, and antenna 350, a down converter 360, and a blanking signal generator 370. The transmission cutoff switch unit 330 and the blanking signal generator 370 are part of the blanking system 305 to selectively stop the transmission of the microwave signal and are further described below.

When not using the blanking system 305 for selectively stopping the transmission of a microwave signal, the transmission system 300 is an exemplary, conventional transmission system. The modem 310 includes a transmission (tx) output 312 and a reception (rx) input 314. The transmission output 312 is coupled to an input 322 of the up converter 320. The up converter 320 converts a modulated infrared (IF) signal received from the modem 310 into a radio frequency (RF) signal ultimately transmitted in amplified form via the antenna 350. When the blanking system 305 is not included in the transmission system 300, the output of the up converter 320 is coupled directly to the amplifier 340. The amplifier amplifies the converted signal received from the output 324 of the up converter 320 and then presents an amplified signal to the antenna 350 at its transmission input 352. The antenna 350 enables the amplified signal to be transmitted to a receiving station, such as a satellite as previously described with reference to FIG. 1.

When a signal is received by the antenna 350, the received signal is presented to a reception output 354 of the antenna 350. The reception output 354 is coupled to a reception input 362 of the down converter 360. The down converter that converts the received, RF signal down in frequency to an IF signal. Once the received signal is converted by the down converter 360, the converted signal is presented at an output 364 of the down converter 360 and is coupled to the reception input 314 of the modem 310.

As previously described, the blanking system 305 selectively stops transmission of a transmitted signal when a communication line of sight path of the antenna 350 is blocked by an obstruction such as one of a plurality of helicopter rotor blades. When the blanking system 305 is used, the transmission cutoff switch unit 330 receives the output 324 of the up converter 320 at an internal switch 332. In one particular illustrative embodiment, the internal switch 332 is a single pole, single throw (SPST) and will be set to an off position 334 or an on position. The internal switch 332 may be an electromechanical or a solid-state device capable of switching an RF signal equal to or greater than an expected magnitude of the converted signal presented by the output 324 of the up converter 320, without damage to the switch or significant degradation to the signal. The internal switch 332 is controlled by a blanking signal output 372 of the blanking signal generator 370.

In a particular illustrative embodiment of FIG. 3, the blanking signal generator 370 is responsive to a received signal strength indicator (RSSI) received at an RSSI input 374 receives an RSSI signal from an RSSI output 366 of the down converter 360. The blanking signal generator 370 monitors the RSSI signal and, based on a periodic drop in the RSSI signal, identifies when the recurring obstruction blocks the communication line of sight path of the antenna 350. According to a particular illustrative embodiment, the blanking signal generator 370 periodically samples the RSSI signal to monitor the signal strength of the received signal presented by the down converter to identify a periodic drop in the signal strength of the received signal represented by the RSSI. When the periodic drop in the signal strength represented by the RSSI includes a drop of a predetermined amount, the periodic drop indicates the recurring obstruction is blocking the communication line of sight path, thereby causing the drop in the signal strength represented by the RSSI.

The predetermined amount used to identify when the recurring obstruction blocks the communication line of sight path may be expressed as a proportion such that a drop in the RSSI by a certain fraction or percentage is identified by the blanking signal generator 370 as being caused by the recurring obstruction blocking the communication line of sight path. Alternatively, the predetermined amount may be a minimum signal strength level. In such an embodiment, the blanking signal generator will determine that the recurring obstruction blocks the communication line of sight path when the RSSI indicates that the signal strength of the received signal reaches or falls below the minimum signal strength level.

It should also be noted that, in the particular illustrative embodiment of FIG. 3, the RSSI output 366 used to determine the signal strength of the received signal is received from the down converter 360. However, the signal strength of the received signal also could be provided by an RSSI output included in another component, such as the antenna 350, the modem 310, or another component.

When the blanking signal generator 370 determines that the recurring obstruction is blocking the communication line of sight path, the blanking signal generator 370 generates a signal that directs the internal switch 332 in the transmission cutoff switch unit 330 to the off position 334. Directing the switch to the off position 334 selectively stops transmission of a transmitted signal by preventing the converted signal presented by the output 324 from being coupled to the amplifier 340 for transmission via the antenna 350. Eldwever, when the blanking signal generator 370 determines the recurring obstruction is not blocking the communication line of sight path, the blanking signal generator 370 generates a signal that directs the internal switch 332 in the transmission cutoff switch unit 330 to the on position 336, enabling the transmitted signal to be presented to the amplifier 340 and transmitted via the antenna 350.

The blanking signal generator 370, in monitoring the signal strength of the received signal, may sample the RSSI to identify a blockage cycle representative of the periodic drop in the signal strength of the received signal. In one particular embodiment, the signal strength represented by the RSSI should be sampled at a rate that, based on a relative duration of the periodic drop in signal, enables an accurate determination of when the recurring obstruction blocks the communication line of sight of the antenna 350. For example, in an embodiment where the recurring obstruction includes a plurality of helicopter rotor blades, the sampling rate should take into account that the plurality of helicopter rotor blades rotates between approximately 150 rotations and 600 rotations per minute, and should consider what portion of each of those rotations that one of the plurality of helicopter rotor blades is blocking the communication line of sight path. Upon identifying a blockage signal resulting from the recurring obstruction's blockage of the communication line of sight path, the blanking signal generator 370 can generate a periodic blanking signal at the blanking signal output 372 to control the transmission cutoff switch unit 330. The blanking signal generated thus enables the transmission cutoff switch unit 330 to be synchronized to the recurring obstruction of the communication line of sight path to selectively stop the transmission of a transmitted signal when the communication line of sight path is blocked.

According to an alternative illustrative embodiment, the blanking system 305 may be implemented without including a separate transmission cutoff switch unit 330 when another transmission cutoff device is available. For example, one of the existing transmission devices, such as the modem 310, the up converter 320, the amplifier 340, or the antenna 350 may be provide a transmission cutoff device that selectively stops or mutes a transmitted signal upon receipt of a control signal. Accordingly, the up converter 320 may be coupled directly to the amplifier 340, and the blanking signal generator 370 may provide the blanking signal to the transmission device configured to selectively stop transmission of the transmitted signal. The blanking signal generator 370 may be configured to provide the transmission blanking signal in a form suitable to cause one of the transmission devices to selectively stop transmission of the transmitted signal.

Figure 4:
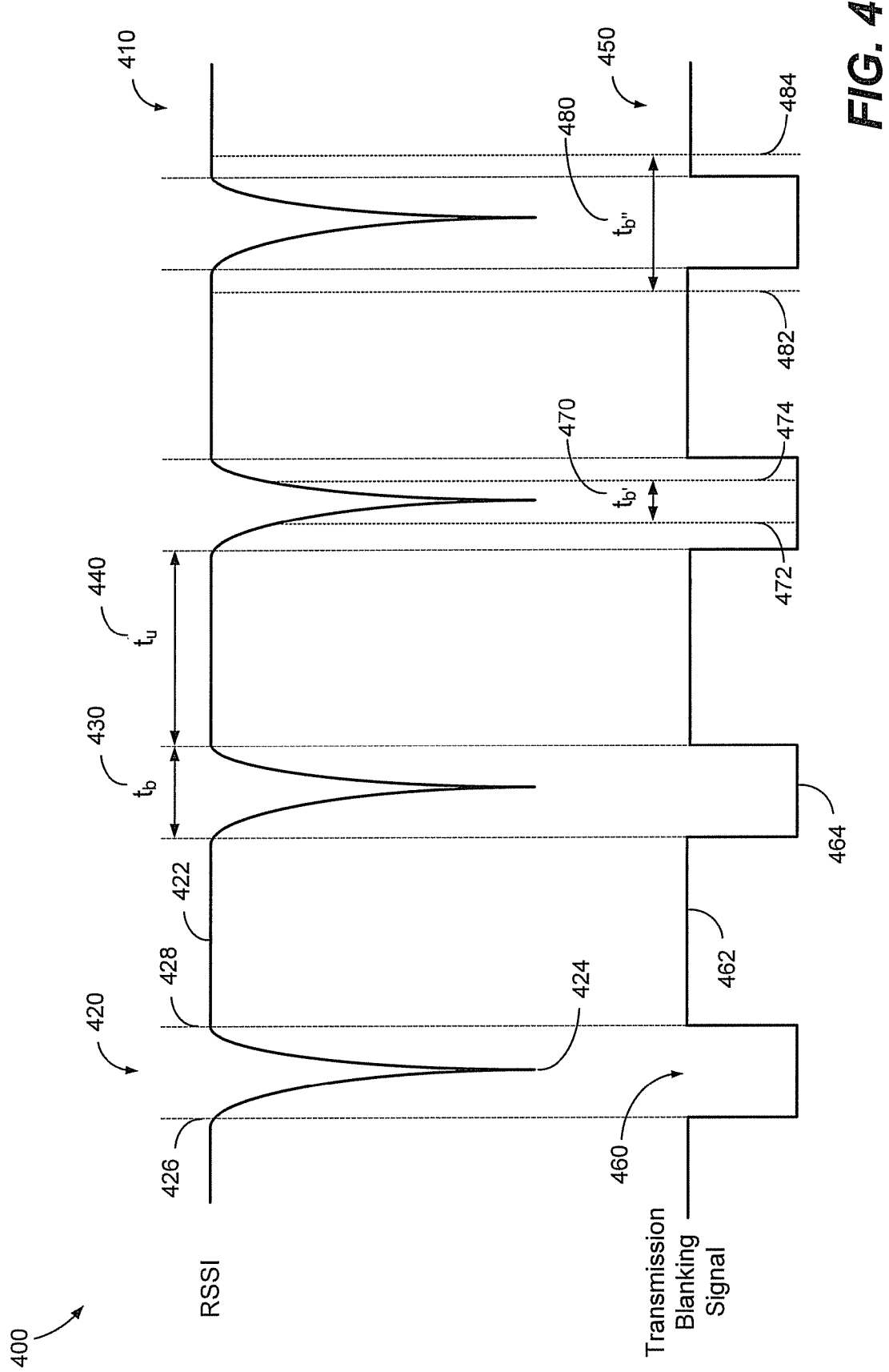
FIG. 4 is a graph of an RSSI signal used to determine a blockage cycle and a blanking signal generated in response to the blockage cycle.

FIG. 4 is a graph 400 illustrating an RSSI signal 410 and a transmission blanking signal 450 derived from the RSSI signal 410. The RSSI signal 410 includes a plurality of periodic drops 424 in the RSSI where the RSSI drops from a high signal strength 422 to a low signal strength 424. The periodic drops 420 each begin at a starting point 426, when the RSSI begins to decline, and end at an ending point 428, when the RSSI resumes its previous level high signal strength 422. The periodic drops 420 thus have an interval $t_b$ 430, a time during which the communication line of sight path is blocked. An interval $t_u$ 440 represents an interval during which the communication line of sight path is unblocked.

According to one particular illustrative embodiment, the transmission blanking signal 450 includes a square wave-type signal in which the transmission blanking signal 450 is presented at a high or on level 462 that enables a transmitted signal to be transmitted during each unblocked interval $t_u$ 440 when the communication line of sight path is unblocked. By contrast, the transmission blanking signal 450 is presented at a low or off level 464 that prevents the transmitted signal from being transmitted during each blocked interval $t_b$ 430 when the communication line of sight path is blocked. Thus, for example with reference to the particular illustrative embodiment of FIG. 3, the transmission blanking signal 450 will cause the transmission cutoff switch unit 330 to drive the switch to the on position 336 during each unblocked interval $t_u$ 440 when the communication line of sight path is unblocked. On the other hand, the transmission blanking signal 450 will cause the transmission cutoff switch unit 330 to drive the internal switch 332 to the off position 334 during each blocked interval $t_b$ 430 when the communication line of sight path is blocked. By generating a transmission blanking signal 450 that corresponds with a blockage cycle, the transmission blanking signal is synchronized to selectively stop transmission of the transmitted signal when the recurring obstruction periodically blocks the communication line of sight path.

The transmission blanking signal 450 may be adjusted to prevent the transmission of the transmitted signal for shorter or longer intervals. For example, it may be determined that the transmitted, signal will not be reflected and scattered to an appreciable degree or not at all or even after the RSSI 410 has begun to decline at a point 472 or before the RSSI 410 has regained its high signal strength 422 at a point 474. In such a case, for example, it may be desirable to select a shortened blocking interval $t_b$, 470. On the other hand, it may be determined that, to ensure the transmitted signal will not be reflected and scattered, transmission of the transmitted signal should be selectively stopped before the RSSI 410 has begun to decline at a point 482 and continuing until a point after the RSSI 410 has regained its high signal strength 422 at a point 484. In such a case, for example, it may desirable to selected a longer blocking interval $t_b$, 480. Shortening or lengthening the blocking interval will inversely lengthen or shorten, respectively, the unblocked interval. The relative duration of the blocking and unblocked intervals may be made to balance interests in enabling higher available transmission intervals against a risk of reflection and scattering of transmitted signals.

Figure 5:
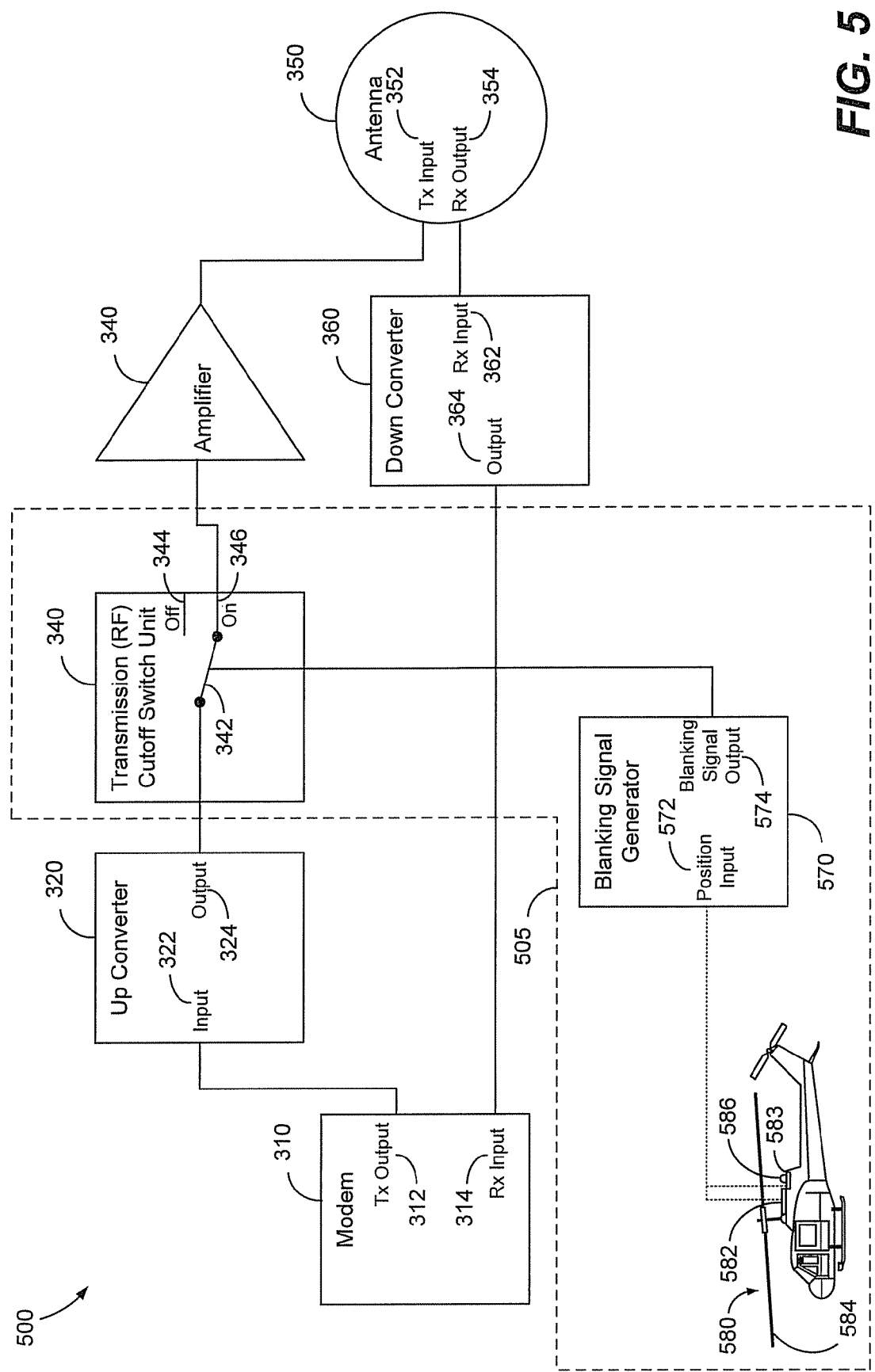
FIG. 5 is a block diagram of a particular illustrative embodiment of a system for determining a blockage cycle of the plurality of helicopter rotor blades by using a position sensor to determine when a position of the plurality of helicopter rotor blades will block a communication line of sight path of a microwave signal.

FIG. 5 is a block diagram of a communications system 500 including another particular illustrative embodiment of a blanking system 505 for selectively stopping the transmission of a microwave signal when an obstruction, such as one of a plurality of helicopter rotor blades, blocks a communication line of sight path of a microwave antenna. Like the communication system 300 of FIG. 3, the communication system 500 includes a modem 310, an up converter 320, a transmission cutoff switch unit 330, an amplifier 340, and antenna 350, a down converter 360, a blanking signal generator 570, and a position sensor 582. The transmission cutoff switch unit 330, the blanking signal generator 570, and the position sensor 582 are part of the blanking system 505 to selectively stop the transmission of the microwave signal and are further described below. With the exception of the blanking signal generator 570 and the position sensor 582, the communications system 500 and the blanking system 505 operate in the same manner as the communications system 300 and the blanking system 305, respectively, of FIG. 3.

In contrast to the blanking system 305 of FIG. 3, the blanking system 505 does not determine when to selectively stop the transmission of a transmitted signal based on monitoring a signal strength of a received signal by monitoring an RSSI signal provided by, for example, the down converter 360. Instead, the blanking signal generator 570 receives at a position input 572 a position signal generated by a position sensor 582 mounted on a helicopter 580. The position sensor 582 determines, based on one or more of the rotational position of a plurality of helicopter rotor blades 584, the angle of attack of the plurality of helicopter rotor blades 584, and other factors, when one of the plurality of helicopter rotor blades 584 blocks a communication line of sight from an antenna position 586 on the helicopter 580. In addition, the blanking signal generator 570 receives a signal from an antenna control unit (ACU) 583 that provides information regarding antenna beam pointing direction in azimuth and elevation. Using both the information from the position sensor 582 and the ACU 583, the blanking signal generator 570 can determine when one of the plurality of helicopter rotor blades is blocking the communication line of sight path.

Using the position signal provided by the position sensor 582, the blanking signal generator 570 generates a blanking signal at a blanking signal output 574 that is provided to the transmission cutoff switch 340. The transmission cutoff switch 340, in response to the transmission blanking signal, selectively stops transmission of the transmitted signal.

Figure 6:
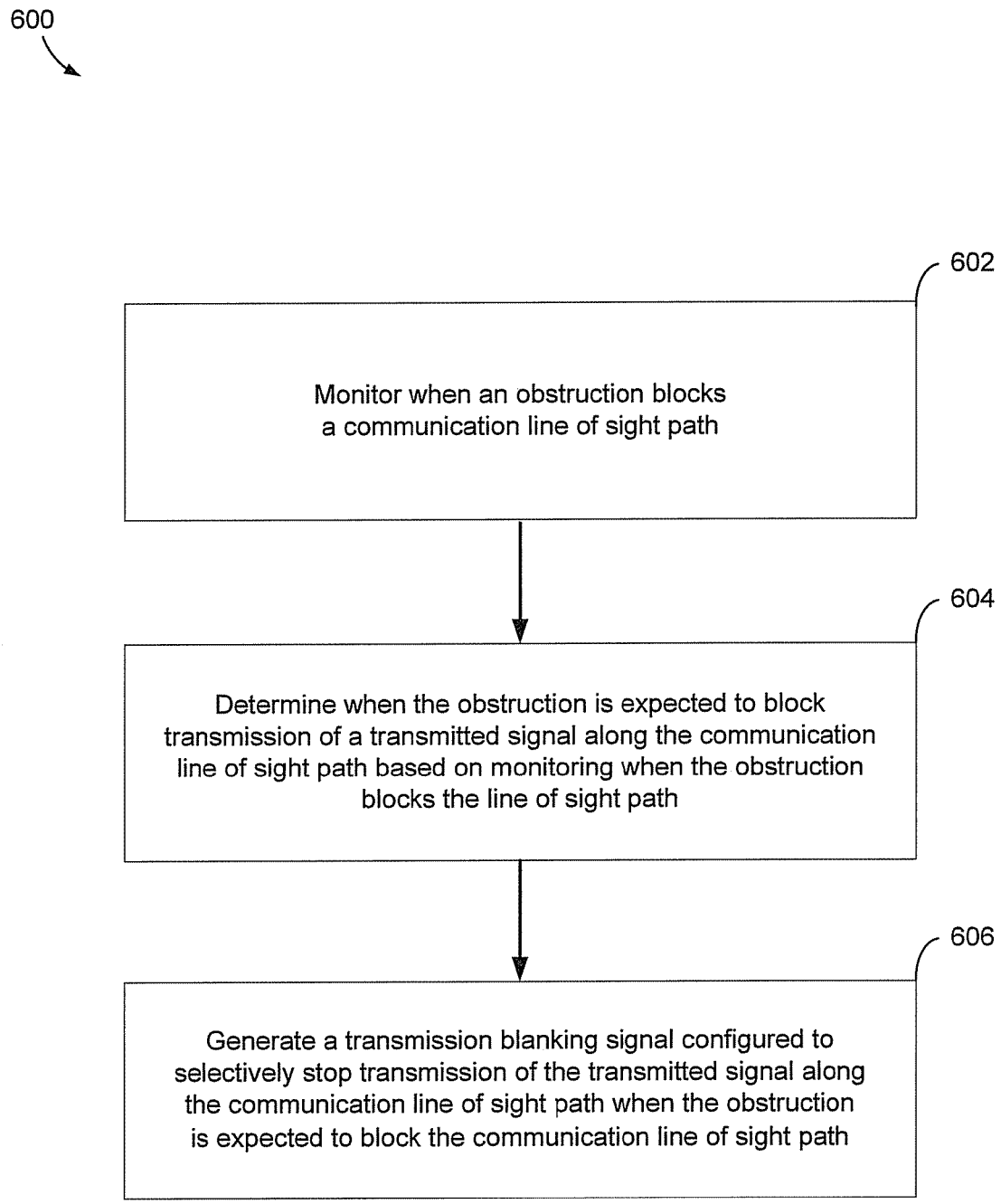
FIG. 6 is a flow diagram of one particular illustrative embodiment of a method for determining when an obstruction blocks a communication line of sight path and to generate a corresponding transmission blanking signal.

FIG. 6 includes a flow diagram 600 of a particular illustrative embodiment of a method to selectively stop transmission of a transmitted signal to prevent the reflection and scattering of the transmitted signal by an obstruction in a communication line of sight path. A communication line of sight path is monitored to determine when an obstruction blocks the communication line of sight path, at 602. Based on monitoring when the obstruction blocks the communication line of sight path, it is determined when the obstruction is expected to block transmission of a transmitted signal along the communication line of sight path, at 604. A transmission blanking signal is generated, where the transmission blanking signal is configured to selectively stop transmission of the transmitted signal along the communication line of sight path when the obstruction is expected to block the communication line of sight path, at 606.

Figure 7:
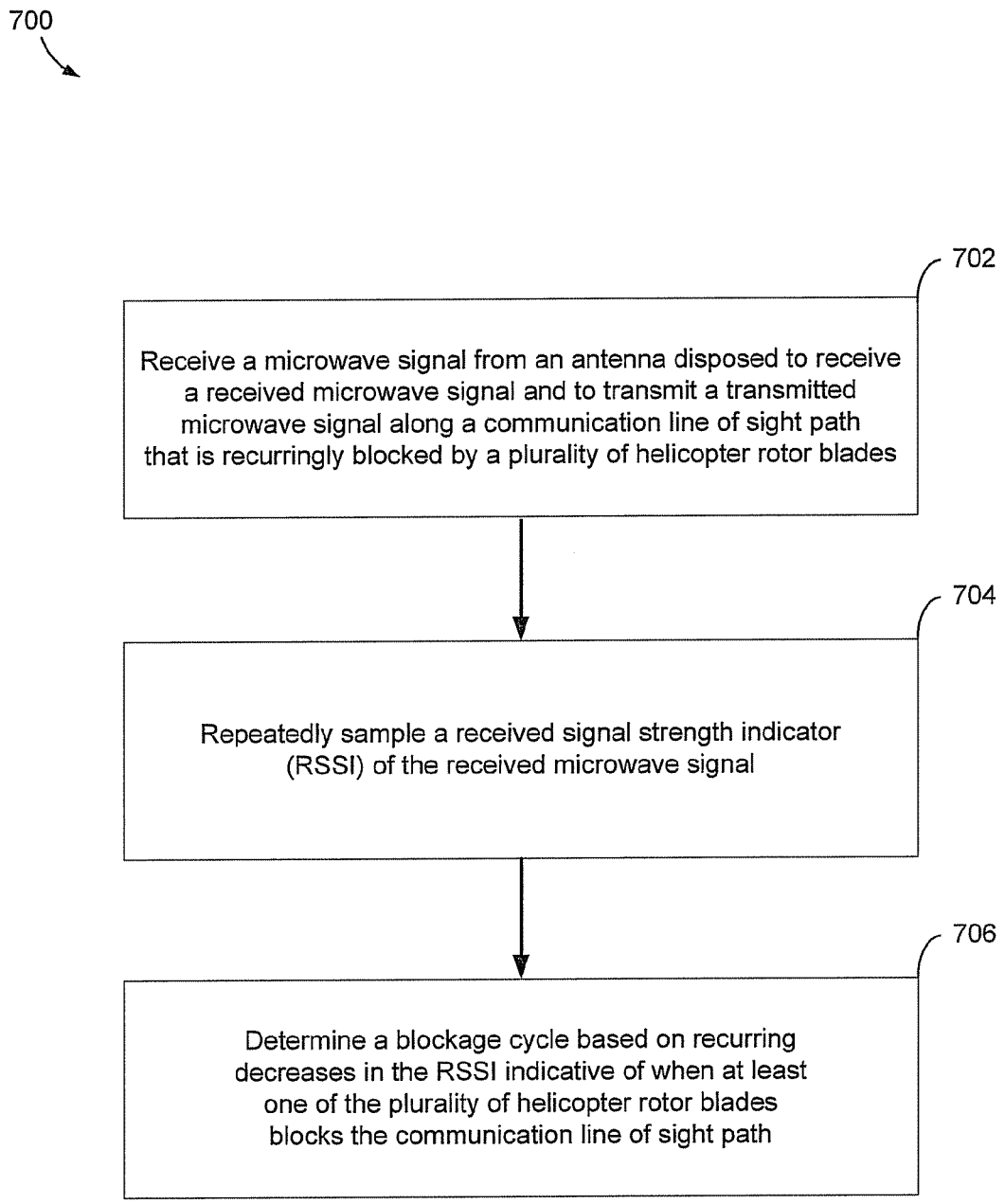
FIG. 7 is a flow diagram of one particular illustrative embodiment of a method for sampling an RSSI to determine when a plurality of helicopter rotor blades blocks a communication line of sight path used by a microwave antenna to transmit a transmitted microwave signal.

FIG. 7 includes a flow diagram 700 of a particular illustrative embodiment of a method to selectively stop transmission of a transmitted microwave signal to prevent the reflection and scattering of the transmitted microwave signal by a one of a plurality of helicopter rotor blades that may recurringly block a communication line of sight path. A microwave signal is received from an antenna disposed to receive a received microwave signal and to transmit a transmitted microwave signal along a communication line of sight path that is recurringly blocked by a plurality of helicopter rotor blades, at 702. A received signal strength indicator (RSSI) of the received microwave signal is repeatedly sampled, at 704. A blockage cycle is determined based on recurring decreases in the RSSI indicative of when at least one of the plurality of helicopter rotor blades is blocking the communication line of sight path, at 706. As previously described, the blockage cycle may be used to generate a blanking signal or otherwise may be used to selectively stop the transmission of a transmitted microwave signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the illustrations or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments and other embodiments not specifically described herein will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim.

Rather, as the following claims reflect, the claimed subject matter may be directed to less than all of the features of any of the disclosed embodiments.

What is claimed is:

1. A method, comprising:
   monitoring when an obstruction blocks a communication line of sight path;
   determining when the obstruction is expected to block transmission of a transmitted signal along the communication line of sight path based on monitoring when the obstruction blocks the communication line of sight path; and
   generating a transmission blanking signal, wherein the transmission blanking signal is configured to selectively stop transmission of the transmitted signal along the communication line of sight path when the obstruction is expected to block the communication line of sight path.

2. The method of claim 1, wherein the obstruction includes a recurring obstruction that periodically blocks the communication line of sight path.

3. The method of claim 2, wherein monitoring when the recurring obstruction periodically blocks the communication line of sight path includes monitoring a signal strength of a received signal that was transmitted substantially along the communication line of sight path.

4. The method of claim 3, wherein generating the transmission blanking signal includes:
   periodically sampling the signal strength of the received signal;

identifying a periodic drop in the signal strength of the received signal, wherein the periodic drop in the signal strength includes a drop of a predetermined amount that indicates when the recurring obstruction blocks the communication line of sight path; and synchronizing the transmission blanking signal to selectively stop transmission of the transmitted signal when the recurring obstruction periodically blocks the communication line of sight path.

5. The method of claim 3, wherein monitoring the signal strength of the received signal includes monitoring a received signal strength indicator (RSSI) received from one of a signal down-converter, a modem, and an antenna.

6. The method of claim 5, wherein the received signal strength indicator generates a digital signal or an analog signal.

7. The, method of claim 2, wherein the recurring obstruction is caused by rotation of a plurality of aircraft rotor blades.

8. The method of claim 7, wherein determining when the obstruction is expected to block transmission of the transmitted signal along the communication line of sight path includes monitoring a position of the plurality of aircraft rotor blades based on a rotor position signal provided by a position sensor and an antenna beam pointing direction signal provided by an antenna control unit.

9. The method of claim 7, wherein the plurality of aircraft rotor blades includes four helicopter rotor blades configured to rotate between approximately 150 rotations per minute and 600 rotations per minute.

10. The method of claim 1, further comprising providing the transmission blanking signal to a transmissions device configured to stop transmission of the transmitted signal upon receiving the transmission blanking signal.

11. The method of claim 1, further comprising providing the transmission blanking signal to a transmission switch of a transmission system, wherein the transmission blanking signal is configured to cause the transmission switch to selectively stop transmission of the transmitted signal.

12. The method of claim 11, wherein the transmission switch is a radio frequency switch positioned in the transmission system to selectively stop the transmission of the transmitted signal by selectively disconnecting the transmitted signal from:
an up-converter;
an amplifier; or
an antenna.

13. The method of claim 1, wherein the transmitted signal includes a microwave signal.

14. A method, comprising:
receiving a microwave signal from an antenna system configured to receive the microwave signal and configured to transmit a transmitted microwave signal along a communication line of sight path, wherein a plurality of helicopter rotor blades recurringly blocks the communication line of sight path;
repeatedly sampling a received signal strength indicator (RSSI) of the received microwave signal; and
determining a blockage cycle based on recurring decreases in the RSSI indicative of blocked intervals when at least one of the plurality of helicopter rotor blades blocks the communication line of sight path.

15. The method of claim 14, further comprising generating a transmission blanking signal based on the blockage cycle, wherein the transmission blanking signal is configured to stop transmission of the transmitted microwave signal during the blocked intervals.

16. The method of claim 15, further comprising providing the transmission blanking signal to a transmission system, wherein the transmission system stops transmission of the transmitted microwave signal as indicated by the transmission blanking signal.

17. The method of claim 16, wherein the transmission system includes one of:
a transmission device configured to stop transmission of the transmitted signal upon receiving the transmission blanking signal; and
a transmission cutoff switch configured to receive the transmission blanking signal and configured stop the transmission of the transmitted microwave signal as indicated by the transmission blanking signal, wherein the transmission cutoff switch is positioned:
between a transmit modem and an up-converter;
between the up-converter and a transmission amplifier; or
between the transmission amplifier and the antenna system.

18. A system, comprising:
an indicator configured to determine when a communication line of sight path between an antenna mounted on an aircraft and a communication point is blocked by one of a plurality of aircraft rotor blades;
a blanking signal generator, configured to:
receive an input from the indicator signaling when the communication line of sight path is blocked; and
generate a blanking signal to identify when a transmitted signal should be stopped based on when the communication line of sight path is blocked; and
a transmission cutoff device configured to receive the blanking signal and to selectively stop transmission of the transmitted signal, the transmission cutoff device including one of:
a transmission cutoff switch configured to selectively stop propagation of the transmitted signal in response to the blanking signal; and
a transmission device configured to selectively stop transmission of the transmitted signal upon receiving the blanking signal.

19. The system of claim 18, wherein the indicator includes a strength of signal indicator, wherein the strength of signal indicator identifies when the communication line of sight path is blocked by one of the plurality of aircraft rotor blades.

20. The system of claim 18, wherein the indicator includes a position sensor to identify positions of the plurality of aircraft rotor blades and an antenna beam pointing direction of the antenna, wherein one of the position sensor and the indicator is configured to identify when the communication line of sight path is blocked by one of the plurality of aircraft rotor blades.

* * * * *